US009655037B2

(12) United States Patent
Stupar et al.

(10) Patent No.: US 9,655,037 B2
(45) Date of Patent: May 16, 2017

(54) METHOD AND APPARATUS FOR AN IMPROVED MECHANISM FOR SELECTING AN ACCESS POINT

(71) Applicant: QUALCOMM Incorporated, San Diego, CA (US)

(72) Inventors: Patrick Stupar, Nuremberg (DE); Nachiappan Valliappan, San Diego, CA (US); Ahmed Kamel Sadek, San Diego, CA (US); Andrea Garavaglia, Nuremberg (DE); Andreas Maximilian Schenk, Erlangen (DE); Marc Walter Werner, Heroldsberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 306 days.

(21) Appl. No.: 14/247,139

(22) Filed: Apr. 7, 2014

(65) Prior Publication Data
US 2015/0289201 A1 Oct. 8, 2015

(51) Int. Cl.
*H04W 48/20* (2009.01)
*H04W 48/16* (2009.01)
*H04W 48/14* (2009.01)
*H04W 48/06* (2009.01)

(52) U.S. Cl.
CPC ........... *H04W 48/20* (2013.01); *H04W 48/16* (2013.01); *H04W 48/06* (2013.01); *H04W 48/14* (2013.01)

(58) Field of Classification Search
CPC ..... H04W 48/06; H04W 48/14; H04W 48/16; H04W 48/20
See application file for complete search history.

(56) References Cited

U.S. PATENT DOCUMENTS

| 7,047,015 | B2 | 5/2006 | Hawe |
| 7,440,418 | B2 | 10/2008 | Marinier et al. |
| 7,990,915 | B2 * | 8/2011 | Wang .................... H04W 28/06 370/237 |

(Continued)

FOREIGN PATENT DOCUMENTS

CN 103313306 A 9/2013

OTHER PUBLICATIONS

International Search Report and Written Opinion—PCT/US2015/023695—ISA/EPO—Jan. 29, 2016. (13 total pages).

*Primary Examiner* — Habte Mered
(74) *Attorney, Agent, or Firm* — Arent Fox, LLP

(57) ABSTRACT

The present disclosure presents a method and apparatus for identifying an access point (AP) for selection by an access terminal (AT). For example, the method may include receiving a probe request by one or more APs from an AT, wherein the probe request is broadcasted by the AT to the one or more APs, generating load information and Received Signal Strength Indicator (RSSI) values of the probe request at the one or more APs, identifying an AP of the one or more APs for selection by the AT, wherein the AP for selection by the AT is identified by the one or more APs based at least on the load information and RSSI values generated at the one or more APs, and transmitting information of an AP identified by the one or more APs to the AT. As such, an improved mechanism for selecting an access point may be achieved.

12 Claims, 14 Drawing Sheets

(56) References Cited

U.S. PATENT DOCUMENTS

| | | | |
|---|---|---|---|
| 2005/0213579 A1* | 9/2005 | Iyer | H04L 63/1441 370/395.2 |
| 2007/0197246 A1 | 8/2007 | Julian et al. | |
| 2008/0080388 A1* | 4/2008 | Dean | H04L 12/2697 370/252 |
| 2009/0080381 A1 | 3/2009 | Yashar et al. | |
| 2012/0179810 A1* | 7/2012 | Contreras Delpiano | H04W 48/18 709/224 |
| 2012/0287783 A1 | 11/2012 | Kuhn et al. | |
| 2013/0077505 A1 | 3/2013 | Choudhary et al. | |
| 2013/0177002 A1 | 7/2013 | Sun et al. | |
| 2014/0126388 A1* | 5/2014 | Shin | H04W 48/20 370/252 |
| 2014/0204802 A1* | 7/2014 | Han | H04W 48/16 370/255 |
| 2014/0293790 A1* | 10/2014 | Xiao | H04W 28/0289 370/235 |
| 2015/0131483 A1* | 5/2015 | Colban | H04W 48/16 370/254 |
| 2015/0208337 A1* | 7/2015 | Wuellner | H04W 48/20 370/252 |
| 2015/0373579 A1* | 12/2015 | Xu | H04W 28/0289 370/230 |
| 2016/0066227 A1* | 3/2016 | Townend | H04W 48/20 370/331 |

\* cited by examiner

METHOD AND APPARATUS FOR AN IMPROVED MECHANISM FOR SELECTING AN ACCESS POINT

BACKGROUND

The following description relates generally to communication systems, and more particularly to selecting an access point (AP) by an access terminal (AT).

In a dense Wi-Fi environment, there are many candidate APs that an AT can select. However, it is important that legacy access terminals (ATs), for example, ATs that do not support newer version of hotspot 2.0 specifications, e.g., hotspot 2.0 v1.0.0 specification, select the best available access point (AP), and vice versa. For example, the best available AP may be the AP that provides higher performance of communications between the AT and the AP.

Therefore, there is a desire for a method and apparatus for an improved mechanism for selecting an access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for identifying an access point (AP) for selection by an access terminal. For example, in an aspect, the present disclosure presents an example method for receiving a probe request by one or more APs from an AT, wherein the probe request is broadcasted by the AT to the one or more APs, generating load information and Received Signal Strength Indicator (RSSI) values of the probe request at the one or more APs, identifying an AP of the one or more APs for selection by the AT, wherein the AP for selection by the AT is identified by the one or more APs based at least on the load information and RSSI values generated at the one or more APs, and transmitting information of an AP identified by the one or more APs to the AT.

In an additional aspect, the present disclosure presents an example method and apparatus for selecting an access point (AP) at an access terminal (AT). For example, in an aspect, the present disclosure presents an example method for transmitting a probe request, by the AT, to one or more APs, wherein the probe request is broadcasted by the AT to the one or more APs, receiving a response to the probe request from at least one of the one or more APs, wherein the response received from an AP identifies the AP for selection by the AT, and selecting the AP identified in the response received by the AT.

Further, the present disclosure presents an apparatus for identifying an access point (AP) for selection by an access terminal (AT). For example, in an aspect, the present disclosure presents an apparatus that comprises a probe receiving component to receive a probe request by one or more APs from an AT, wherein the probe request is broadcasted by the AT to the one or more APs, a load generating component to generate load information and Received Signal Strength Indicator (RSSI) values of the probe request at the one or more APs, an AP identifying component to identify an AP of the one or more APs for selection by the AT, wherein the AP for selection by the AT is identified by the one or more APs based at least on the load information and RSSI values generated at the one or more APs, and a transmitting component to transmit information of an AP identified by the one or more APs to the AT.

Furthermore, the present disclosure presents an apparatus for selecting an access point (AP) at an access terminal (AT). For example, in an aspect, the present disclosure presents an apparatus that comprises a probe transmitting component to transmit a probe request, by the AT, to one or more APs, wherein the probe request is broadcasted by the AT to the one or more APs, a response receiving component to receive a response to the probe request from at least one of the one or more APs, wherein the response received from an AP identifies the AP for selection by the AT, and an AP selection component to select the AP identified in the response received by the AT.

Additionally, the present disclosure presents an example method and apparatus for generating beacons or probe response at one or more access points (AP). For example, in an aspect, the present disclosure presents an example method for generating a beacon or a probe response at an AP of the one or more APs based at least on a load at the AP, adjusting transmission power of the beacon or the probe response generated at the AP based at least on the load at the AP, and transmitting the beacon or the probe response from the AP to an access terminal (AT) based at least on the adjusted transmission power.

In a further aspect, the present disclosure presents an apparatus for generating beacons or probe response at one or more access points (AP). For example, in an aspect, the present disclosure presents an apparatus that comprises generating a beacon or a probe response at an AP of the one or more APs based at least on a load at the AP, reducing transmission power of the beacon or the probe response generated at the AP based at least on the load at the AP, and transmitting the beacon or the probe response from the AP to an access terminal (AT) based at least on the reduced transmission power.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

Figure 1:
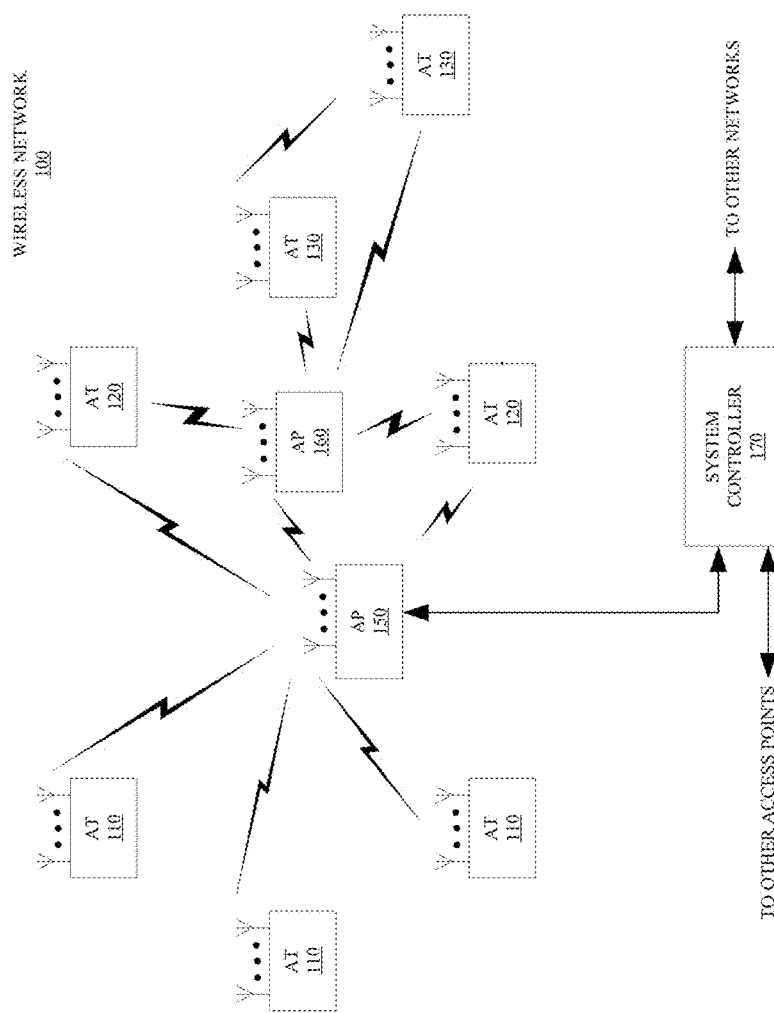
FIG. 1 is a diagram of a wireless communications network, in aspects of the present disclosure.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

A method and an apparatus are disclosed for selecting an access point (AP) at an access terminal (AT). For example, when an AP and an AT are at different versions of Hotspot Specifications (e.g., different versions of Hotspot 2.0 Specifications), the method disclosed herein allows the AT to select the best AP. For example, in an aspect, the AT broadcasts a probe request to one or more APs and receives a response from an AP identifying the AP for selection by the AT. In an additional aspect, an AP generates beacons or probe responses that are based on loads at the AP. The transmit power of the generated beacons or probe responses of the AP may be adjusted (e.g., reduced) when it is determined that the AP is heavily loaded and/or the transmitting of the generated beacons or probe responses to an AT may be delayed when it is determined that the AP is heavily loaded.

Several aspects of a wireless network will now be presented with reference to FIG. 1. The wireless network 100 is shown with several wireless nodes, generally designated as Access Points (AP) 150 and 160 and access terminals (AT) 110, 120, and 130. Each wireless node is capable of receiving and/or transmitting, in the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or an access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for any number of access terminals 110, 120, and/or 130. A system controller 170 may be used to provide coordination and control of the access points, as well as access to other networks (e.g., Internet) for access terminals 110, 120, and/or 130. For simplicity, two access points 150 and 160 are shown in FIG. 1. In an aspect, access points 150 and 160 may be compliant with the same or different versions of hotspot Specifications (e.g., Hotspot 2.0 Specifications). For example, in an aspect, access point 150 may be compliant with hotspot 2.0 "N" (e.g., 1.0) Specifications and/or access point 160 may be compliant with hotspot "N+1(e.g., 2.0) Specifications. Additionally, access terminals 110, 120, and/or 130 may be compliant with the same or different versions of hotspot Specifications (e.g., Hotspot 2.0 Specification). For example, in an aspect, this scenario may occur when some access points are upgraded to be in compliance with a newer version of the hotspot Specifications and/or some other access point are not upgraded to the newer version of the Hotspot 2.0 Specifications.

For example, in an aspect, an access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

In an aspect, the wireless network 100 may support MIMO technology. Using MIMO technology, access points 150 and/or 161) may communicate with multiple access terminals 110, 120, and/or 130 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enable each access terminal 110, 120, and/or 130 to recover the data stream destined for that access terminal. On the uplink, each access terminal 110, 120, and/or 130 transmits a spatially precoded data stream, which enables the access point 150 and/or 160 to identify the source of each spatially precoded data stream.

One or more access terminals 110, 120, and/or 130 may be equipped with multiple antennas to enable certain functionality. With this configuration, multiple antennas at access point 150 and/or 160 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

Figure 2:
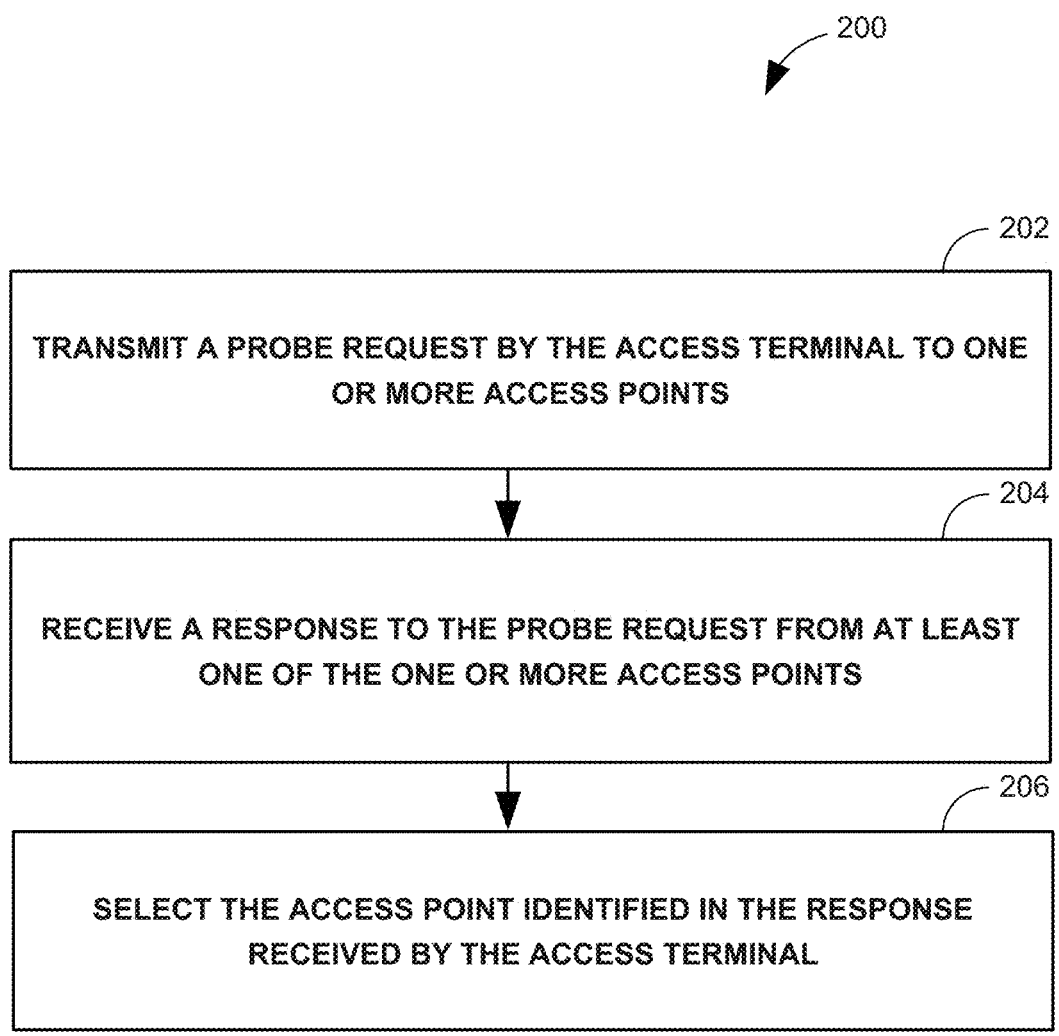
FIG. 2 is an example flow chart for selecting an access point (AP) at an access terminal (AT), in aspects of the present disclosure.

FIG. 2 illustrates an example methodology 200 for selecting an access point (AP) at an access terminal (AT). In an aspect, at block 202, methodology 200 may include transmitting a probe request by the AT to one or more APs. For example, in an aspect, AT 120 may transmit a probe request to APs 150 and/or 160. In an additional aspect, the probe request from AT 120 may be broadcasted by the AT to APs 150 and 160. In an aspect, the approach where the ATs broadcast probe requests to APs may be described as a "reactive" approach as the APs are responding or reacting to probe requests from an AT.

Additionally, at block 204, methodology 200 may include receiving a response to the probe request from at least one of the one or more APs. For example, in an aspect, AT 120 may receive a response from one or more APs, e.g., APs 150 and/or 160. In an additional aspect, the response received from APs 150 and/or 160 may include the identity of the AP for selection by AT 120. For example, the probe response received by AT 120 from AP 150 may include the identity of AP 150 for selection by AT 120. In an aspect, APs coordinate with each other and identify the AP more suitable for the AT. This also addressed the issues related to AT and AP compliant with different versions of the Specifications.

Additionally, at block 206, methodology 200 may include selecting the AP in the response received by the AT. For example, in an aspect, AT 120 may select AP 150 based on the response received by the AT.

Figure 3:
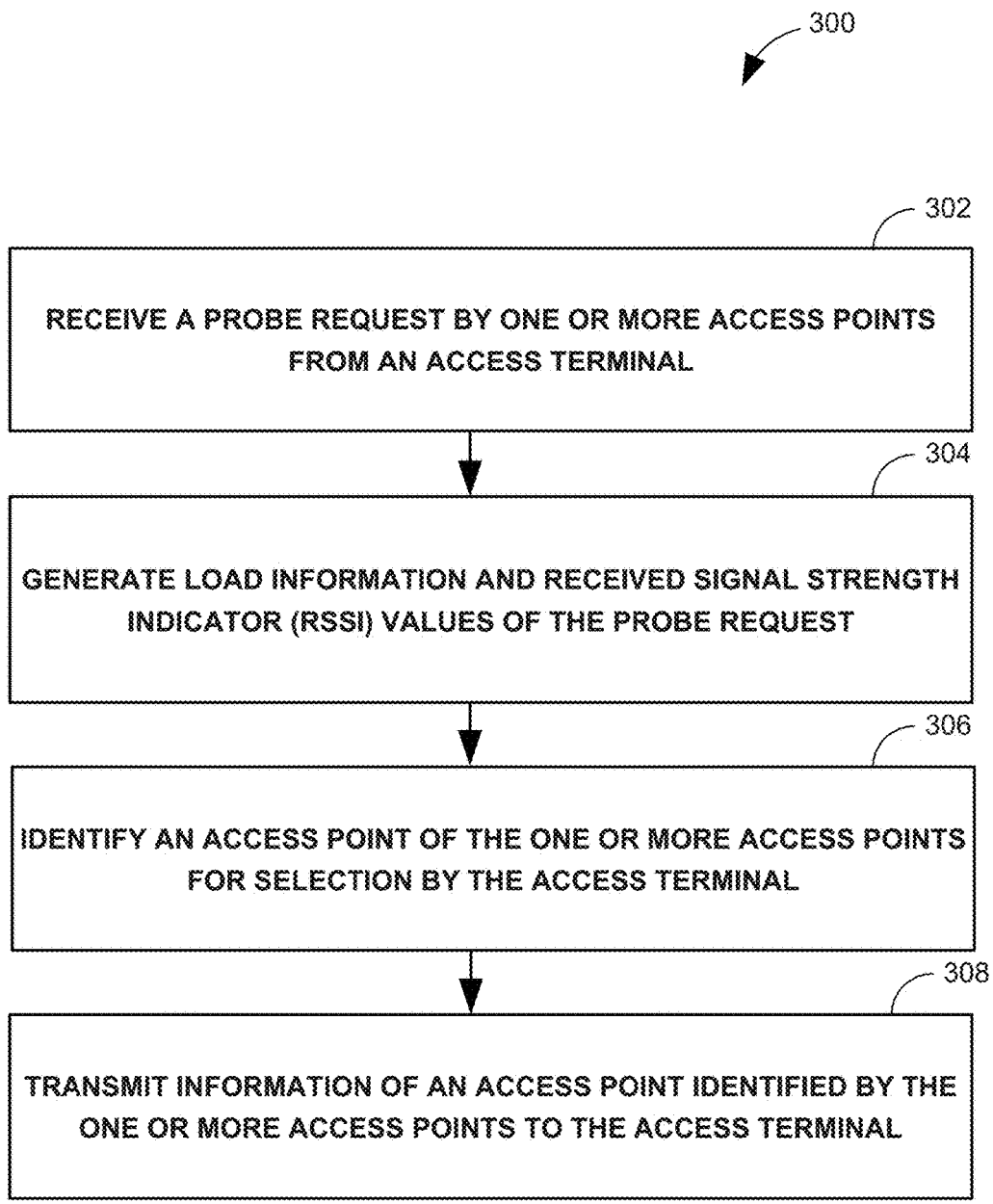
FIG. 3 is an example flow chart for identifying an access point (AP) for selection by an access terminal (AT), in aspects of the present disclosure.

FIG. 3 illustrates an example methodology 300 for identifying an access point (AP) for selection by an access terminal (AT). In an aspect, at block 302, methodology 300 may include receiving a probe request by one or more APs from an AT. In an aspect, for example, APs 150 and/or 160 may receive a probe request from one or more AT 150. In an additional aspect, the probe from AT 150 may have been broadcasted to ATs 150 and/or 160.

Additionally, at block 304, methodology 300 may include generating load information and Received Signal Strength Indicator (RSSI) values of the probe request at the one or more APs. For example, in an aspect AP 150 may generate information about the load at AP 150 and RSSI of the probe request received from AT 120. Additionally, AP 160 may generate information about the load at AP 160 and RSSI of the probe request received from AT 120. For example, in an aspect, the load at an AP may be defined as the number of ATs connected to the AP.

In an example aspect, the load at an AP, for example, Load "L," may be a function of one or more of a number of ATs connected to the AP, traffic on the AP at the time the probe request was received from the AT, last association event, latency, quality of the backhaul of the AP, and/or any policies set on the AP. Once the load, and RSSI values are generated, the APs may be listed according to an utility function, for example, $U_i = f(L_i, RSSI_i)$ where "i" indexes APs and $f(L_i, RSSI_i)$ increases if $L_i$ decreases or $RSSI_i$ increases.

Further, at block 306, methodology 300 may include identifying an AP of the one or more APs for selection by the AT, wherein the AP for selection by the AT is identified by the one or more APs based at least on the load information and RSSI values generated at the one or more APs (e.g., lowest load and/or highest RSSI values, or a combination). For example, in an aspect, a central server (not shown in the Figs), for example, a management server, may be used to calculate the ranking of the APs and identify an AP based on the rankings of the AP prior to transmitting to the AT. This will be enable the AT select the best possible AP in a much more efficient manner, in an additional or optional aspect, an AP with the highest value of $U_i$ may be transmitted to the AT or a plurality of APs in listed as per their ranks may be transmitted to the AT in case the AT cannot connect to the AP with the highest value.

In an additional or optional aspect, APs may be in communication with each other and only the AP with the highest value of Ui may transmit the probe response to the AT. In a further additional or optional aspect, the central server described above may process the probe responses of the APs and only transmit the probe response with the highest rank as described above.

Furthermore, at block 308, methodology 300 may include transmitting information of an AP identified by the one or more APs to the AT. For example, in an aspect, AP 150 and/or 160 may transmit the identity of the AP to the AT.

Figure 4:
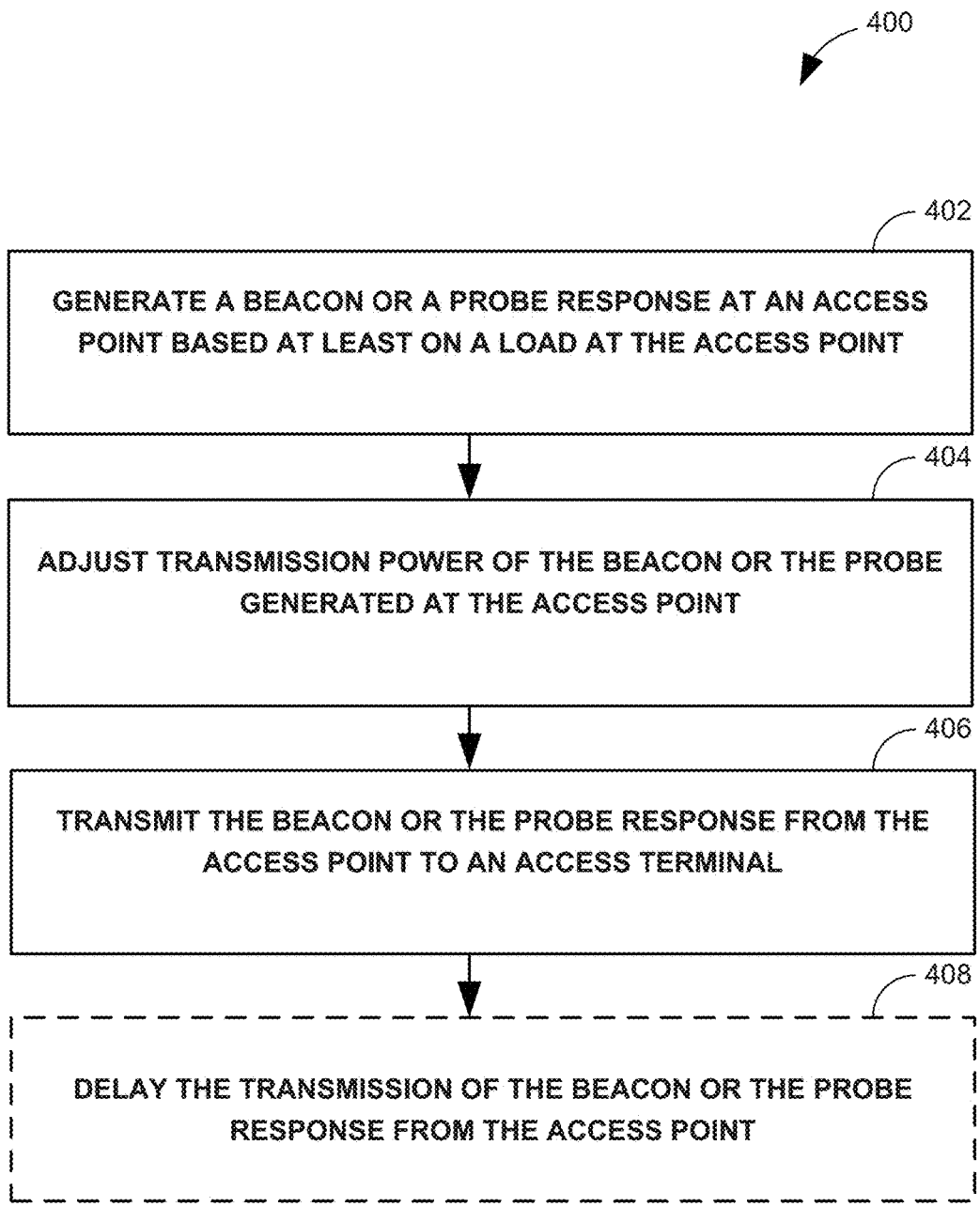
FIG. 4 is an example flow chart for generating beacons or probe responses at an access point (AP), in aspects of the present disclosure.

FIG. 4 illustrates an example methodology 400 for generating beacons or probe responses at an AP. For example, in an aspect, beacons may be continuously generated by an AP and broadcasted to ATs and/or probe responses may be generated in response to probe requests received from ATs.

In an aspect, at block 402, methodology 400 may include generating a beacon or a probe response at an AP of the one or more APs based on at least a load at an AP. For example, in an aspect, APs 150 and/or 160 may generate a beacon based on the load at the AP. For example, in an aspect, the load at an AP may be defined as the number of ATs connected to the AP. That is, the beacon or the probe response generated by an AP may be dependent on the load at the AP that is generating the beacon or the probe response. In an aspect, the approach where the APs broadcast beacons or probe responses to ATs may be described as a "pro-active" approach.

Additionally, at block 404, methodology 400 may include adjusting transmission power of the beacon or the probe response generated at the AP based at least on the load at the AP. For example, in an aspect, AP 150 and/or 160 may adjust (e.g., reduce) the transmission power of the beacon or the probe response generated by APs 150 and/or 160 based on whether the AP is heavily loaded or not. For example, a network operator may define when an AP is considered as heavily loaded, e.g., when an AP is at/above 75% of an AP's engineered queue's capacity. In an additional example, the loads of the various APs may be ranked and the APs in the top 25% or 33% of the rankings may be considered as heavily loaded. Furthermore, if the load on AP 150 is high, the AP may adjust (e.g., lower) the transmit power of the generated beacon or the probe response. In an optional aspect, threshold values may be configured by the network operator associated with low, medium and/or high load values to determine when the transmit powers are to be adjusted.

Further, at block 406, methodology 400 may include transmitting the beacon or the probe response from the AP to an access terminal (AT) based at least on the adjusted transmission power. For example, in an aspect, the beacon or the probe response may be transmitted from the AP to the AT based on the reduced transmission power.

In an additional aspect, reduced power of the transmitted beacon or the probe response may indicate to the AT that the AP transmitting the beacon or the probe response at a lower transmit power may be highly loaded (based on the how the threshold values are set at the APs) and may not the optimal candidate for selection by the AT.

In an optional aspect, at block 408, methodology 400 may include delaying the transmission of the beacon or the probe response from the AP based at least on the load of the AP. For example, in an aspect, the beacon or the probe response may be delayed based on the load at an AP. For example, when it is determined that an AP is highly loaded, the AP may delay transmitting the beacon or the probe response to the AT. This may provide an opportunity to the AT to select another AP that may be not be as heavily loaded whose beacon or probe response may have been transmitted earlier (e.g., without a delay or with less delay).

In an example aspect, a mapping between load at an AP and the parameters of the beacon or probe response (e.g., transmit power and delay) may be performed in different ways. For example, in an aspect, a centralized entity may collect the load of an AP (e.g., "L") and RSSI of the received probe requests. The centralized entity may provide the values (delay, transmit power) proportional to the value of $g(L_i, RSSI_i)$, which in an aspect, may be similar to $f(L_i, RSSI_i)$ described above.

In an additional example aspect, each AP may establish the values (transmit power and delay) in a distributed way such that the established values are proportional to the value of $h(L_i, RSSI_i)$ as described above. In a further additional aspect, a "mapping" table which may be pre-configured in an AP or exchanged among the APs of the network may be used.

In an additional aspect, transmission power (TPC) report element may be used to indicate that the transmit power used to send the beacons and/or the probe responses. The AT may use this element to calculate the path loss (PL) and select the AP with the best (e.g., lowest) PL. Additionally, the APs may insert an arbitrary value in this element in order to control the obtained PL and influence the AT to connect to the best available AP.

In a further aspect, an AP channel report, that may include the list of channels for neighboring APs, may be inserted in the beacons and/or the probe responses and may be sent to the AT. This may allow the AT to look for neighboring APs when looking for the best AP. For example, in an aspect, the best AP may be an AP with the lowest number of camped ATs and/or an AP with the lowest PL.

In an additional aspect, load information "L" may be used to populate the following information elements included in the beacons or the probe responses. For example, a BSS load element that captures BSS loading element, a BSS Average Access Delay which is a measure of load in the BSS, BSS available admission capacity that may contain a list of available admissions fields at different user priorities and access categories, and a BSS AC access delay that may average access delay for each indicated ACs at QoS APs.

Figure 5:
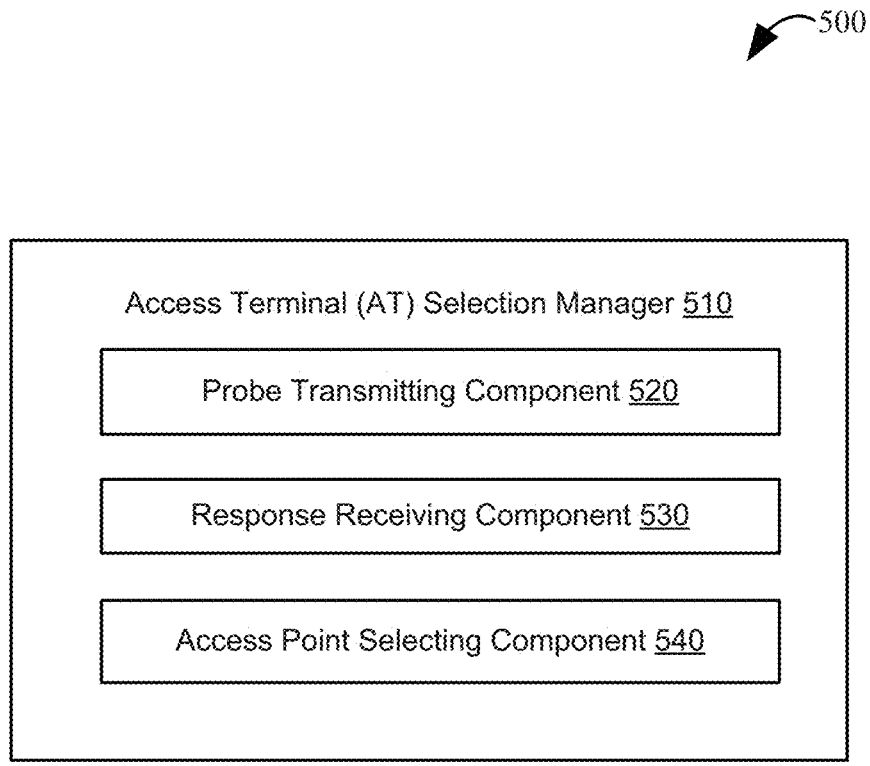
FIG. 5 is a block diagram illustrating an example access terminal (AT) selection manager, in aspects of the present disclosure.

FIG. 5 illustrates an example access terminal (AT) selection manager 510 and various components that may be included in some aspects of AT selection manager 510 for selecting an AP at an AT. For example, in an aspect. AP selection manager 510 may include one or more of a probe transmitting component 520, a response receiving component 530, and/or an AP selecting component 540.

In an aspect, probe transmitting component 520 may be configured to transmit a probe request, by the AT, to one or more APs, wherein the probe request is broadcasted by the AT to the one or more APs. For example, in an aspect, AT 120 may broadcast a probe to APs 150 and/or 160. In an additional aspect, response receiving component 530 may be configured to receive a response to the probe request from at least one of the one or more APs, wherein the response received from an AP identified the AP for selection by the AT. For example, in an aspect, AT 120 may receive a response from APs 150 and/or 160 identifying an AP. e.g., AP 150 for selection by the AT.

Additionally, in an aspect, AP selecting component 540 may be configured to select the AP identified in the response received by the AT. For example, in an aspect, AT 120 may select AT 150 which is identified in the response received by the AT.

Figure 6:
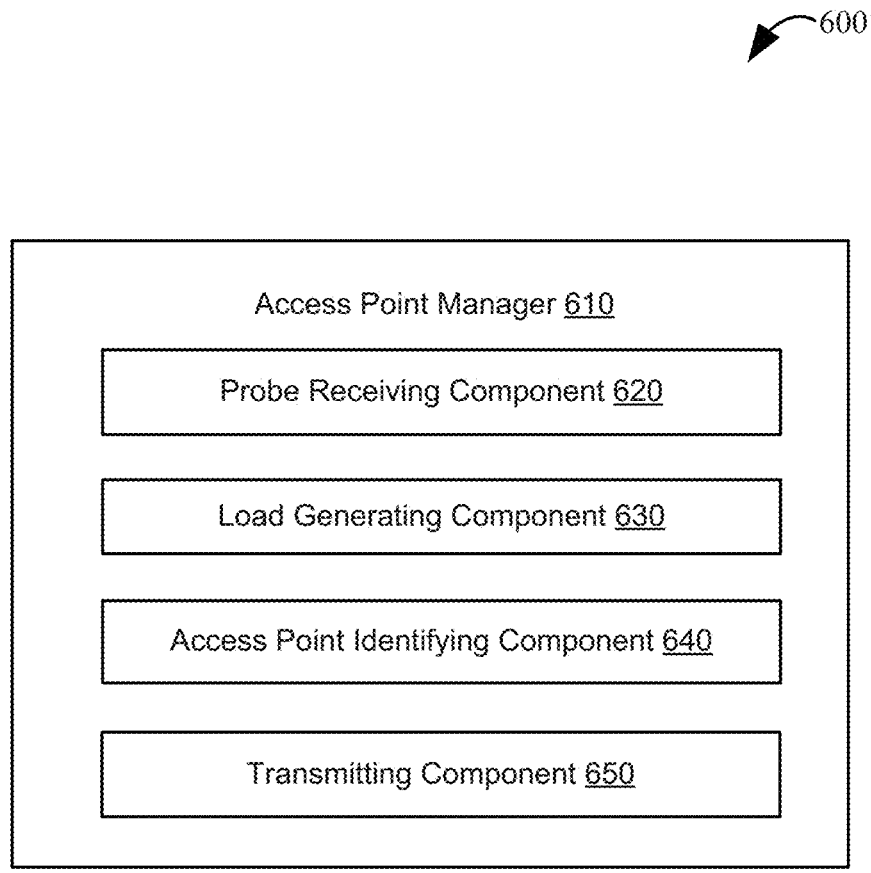
FIG. 6 is a block diagram illustrating an example access point (AP) manager, in aspects of the present disclosure.

FIG. 6 illustrates an example access point (AP) manager 610 and various components that may be included in some aspects of AP manager 610 for identifying an AP for selection by an AT. For example, in an aspect, AP manager 610 may include one or more of a probe receiving component 620, a load generating component 630, au AP identifying component 640, and/or a transmitting component 650.

In an aspect, probe receiving component 620 may be configured to receive a probe request by one or more APs from an AT. For example, in an aspect, APs 150 and/or 160 may receive a probe request from AT 120. In an additional aspect, AP 160 may receive the probe request from AT 120 as the probe is broadcasted by AT 120.

In an aspect, load generating component 630 may be configured to generate load information and RSSI values of the probe request at the one or more APs. For example, in au aspect, load generating component 630 may generate load information of AP 150 and RSSI value of probe request received from AT 120.

In an aspect, access identifying component 640 may be configured to identify an AP of the one or more APs for selection by the AT. In an aspect, for example, the AP for selection by the AT may be identified by the one or more APs based at least on the load information and RSSI values generated at the one or more APs.

In an aspect, transmitting component 650 may be configured to transmit information of an AP identified by the one or more APs to the AT. For example, in an aspect, transmitting component 650 may transmit the identified AP information to the AT.

Figure 7:
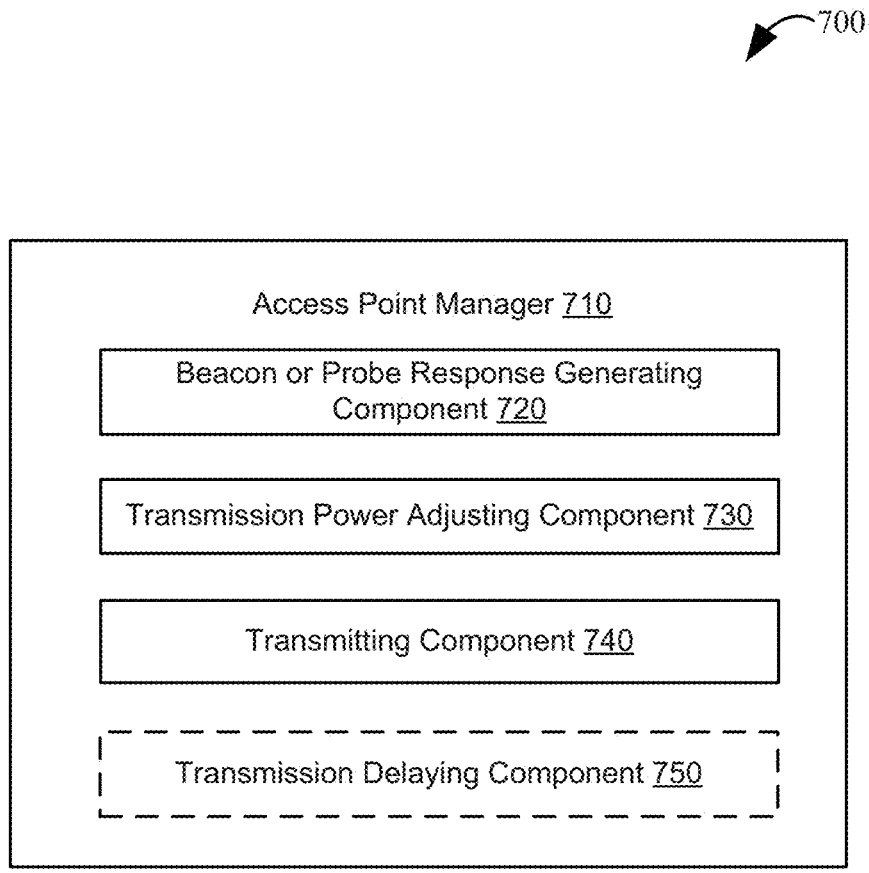
FIG. 7 is a block diagram illustrating an additional example access point (AP) manager, in aspects of the present disclosure.

FIG. 7 illustrates an additional example access point (AP) manager 710 and various components that may be included in some aspects of AP manager 710 for generating beacons or probe responses at one or more APs. For example, in an aspect, AP manager 710 may include one or more of a beacon or probe response generating component 720, a transmission power adjusting component 730, transmitting component 540, and/or optionally a transmission delaying component 750.

In an aspect, beacon or probe response generating component 720 may be configured to generate a beacon or a probe response at one or more APs based on a load at an AP. For example, in an aspect, beacon or probe response generating component 720 may generate a beacon that is broadcasted to APs 120 and/or 130. In a further aspect, transmission power adjusting component 730 may be configured to adjust transmission power of the beacon or the probe response generated at least based on the load at the AP.

Additionally, in an aspect, transmitting component 740 may be configured to transmit the beacon or the probe response from an AP to an AT based at least on the adjusted transmission power. In an optional aspect, transmission delaying, component 750 may be configured to delay the transmission of the beacon or the probe response from the AP based at least on the load of the AP.

Figure 8:
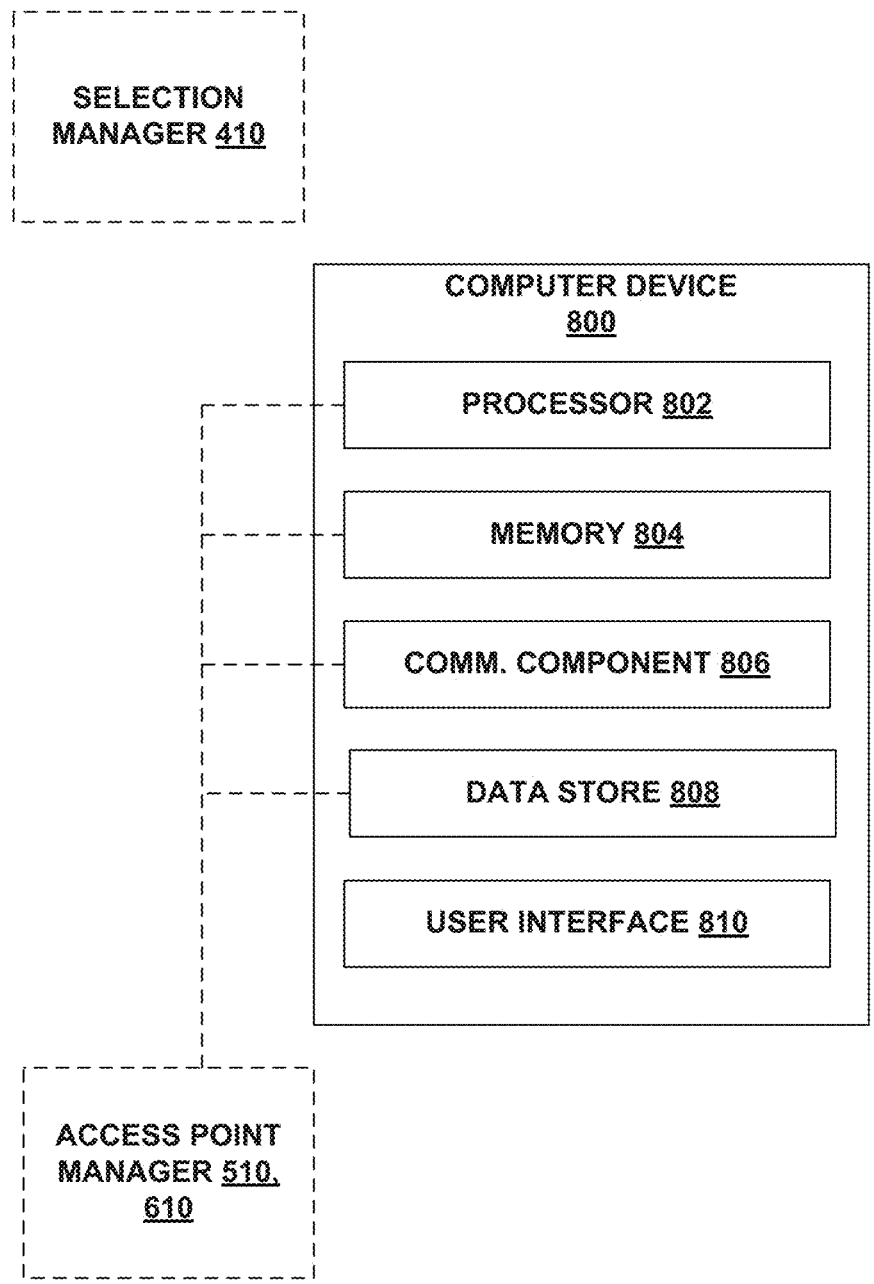
FIG. 8 is a block diagram illustrating aspects of a computer device according to the present disclosure.

Referring to FIG. 8, in an aspect, access terminals 110, 120, and 130 and/or access points 180 and/or 160 may be represented by a specially programmed or configured computer device 800. In one aspect of implementation, computer device 800 may include AT 110/120/130 and/or AT selection manager 510; and/or AP 150/160 and/or AP manager 610 (FIGS. 1, 5-7), such as in specially programmed computer readable instructions or code, firmware, hardware, or some combination thereof. Computer device 800 includes a processor 802 for carrying out processing functions associated with one or more of components and functions described herein. Processor 802 can include a single or multiple set of processors or multi-core processors. Moreover, processor 802 can be implemented as an integrated processing system and/or a distributed processing system.

Computer device 800 further includes a memory 804, such as for storing data used herein and/or local versions of applications being executed by processor 802. Memory 804 can include any type of memory usable by a computer, such as random access memory (RAM), read only memory (ROM), tapes, magnetic discs, optical discs, volatile memory, non-volatile memory, and any combination thereof.

Further, computer device 800 includes a communications component 806 that provides for establishing and maintaining communications with one or more parties utilizing hardware, software, and services as described herein. Communications component 806 may carry communications between components on computer device 800, as well as between computer device 800 and external devices, such as devices located across a communications network and/or devices serially or locally connected to computer device 800. For example, communications component 806 may include one or more buses, and may further include transmit chain components and receive chain components associated with a transmitter and receiver, respectively, or a transceiver, operable for interfacing with external devices. In an additional aspect, communications component 806 may be configured to receive one or more pages from one or more subscriber networks. In a further aspect, such a page may correspond to the second subscription and may be received via the first technology type communication services.

Additionally, computer device 800 may further include a data store 808, which can be any suitable combination of hardware and/or software, that provides for mass storage of information, databases, and programs employed in connection with aspects described herein. For example, data store 808 may be a data repository for applications not currently being executed by processor 802 and/or any threshold values or finger position values.

Computer device 800 may additionally include a user interface component 810 operable to receive inputs from a user of computer device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Figure 9:
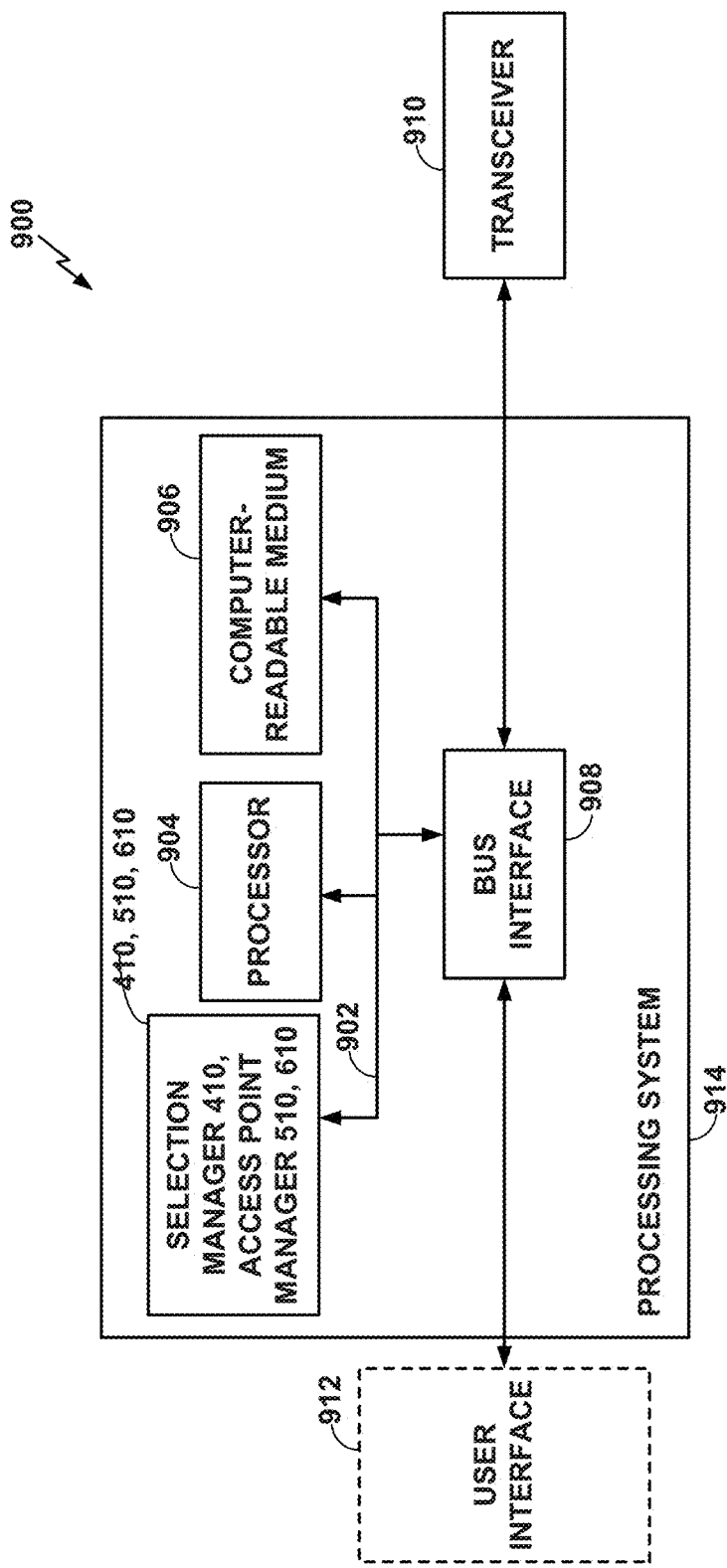
FIG. 9 is a block diagram illustrating an example of a hardware implementation for an apparatus employing a processing system.

FIG. 9 is a block diagram illustrating an example of a hardware implementation for an apparatus, including, for example, AT 110/120/130 and/or AT selection manager 510; and/or AP 150/160 and/or AP manager 610 (FIGS. 1, 5-7), employing a processing system 914 for carrying out aspects of the present disclosure, such as method for IRAT cell reselection. In this example, the processing system 914 may be implemented with bus architecture, represented generally by a bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and one or more components described herein, such as, but not limited to, AT selection manager 510 and/or AP manager 610 (FIGS. 5-7). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

Figure 10:
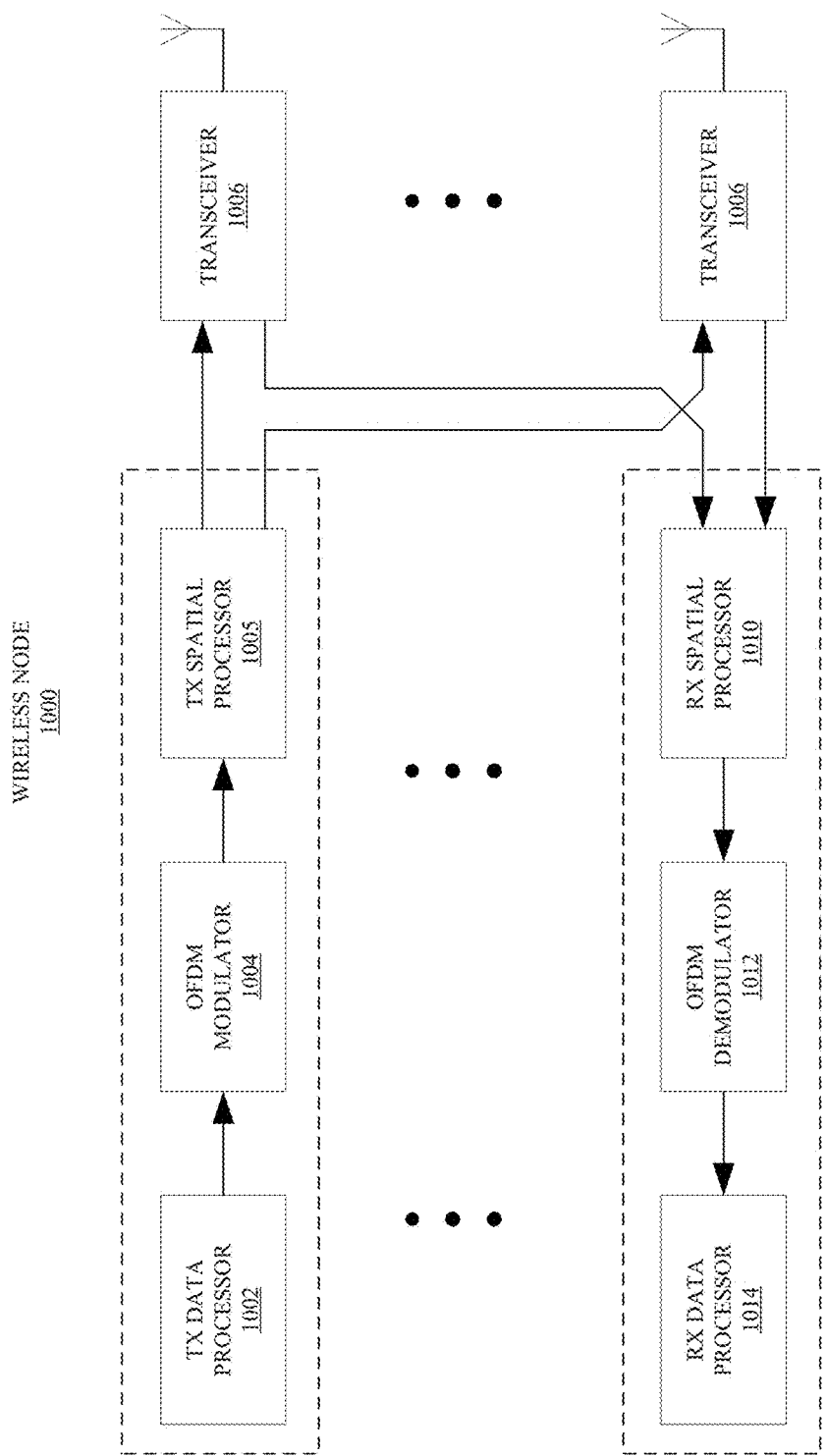
FIG. 10 is a wireless node that includes a front end processing system in a wireless node in the wireless communications network of FIG. 1, in aspects of the present disclosure.

FIG. 10 is a conceptual block diagram illustrating an example of the signal processing functions of the PHY layer. In a transmit mode, a TX data processor 1002 may be used to receive data from the MAC layer and encode (e.g., Turbo code) the data to facilitate forward error correction (ITC) at the receiving node. The encoding process results in a sequence of code symbols that that may be blocked together and mapped to a signal constellation by the TX data processor 1002 to produce a sequence of modulation symbols.

In wireless nodes implementing OFDM, the modulation symbols from the TX data processor 1002 may be provided to an OFDM modulator 1004. The OFDM modulator splits the modulation symbols into parallel streams. Each stream is then mapped to an OFDM sub-carrier and then combined together using an Inverse Fast Fourier Transform Off T) to produce a time domain OFDM stream.

A TX spatial processor 1006 performs spatial processing on the OFDM stream. This may be accomplished by spatially precoding each OFDM and then providing each spatially precoded stream to a different antenna via a transceiver 1006. Each transmitter 1006 modulates an RF carrier with a respective precoded stream for transmission over the wireless channel.

In a receive mode, each transceiver 1006 receives a signal through its respective antenna 1010. Each transceiver 1006 may be used to recover the information modulated onto an RF carrier and provide the information to a RX spatial processor 1010.

The RX spatial processor 1010 performs spatial processing on the information to recover any spatial streams destined for the wireless node 1000. The spatial processing may be performed in accordance with Channel Correlation Matrix Inversion (CCMI), Minimum Mean Square Error (MMSE), Soft interference Cancellation (SIC), or some other suitable technique. If multiple spatial streams are destined for the wireless node 1000, they may be combined by the RX spatial processor 1010.

In wireless nodes implementing OFDM, the stream (or combined stream) from the RX spatial processor 1010 is provided to an OFDM demodulator 1012. The OFDM demodulator 1012 converts the stream (or combined stream) from time-domain to the frequency domain using a Fast Fourier Transform (FFT). The frequency domain signal comprises a separate stream for each sub-carrier of the OFDM signal. The OFDM demodulator 1012 recovers the data (i.e., modulation symbols) carried on each subcarrier and multiplexes the data into a stream of modulation symbols.

A RX data processor 1014 may be used to translate the modulation symbols back to the correct point in the signal constellation. Because of noise and other disturbances in the wireless channel, the modulation symbols may not correspond to an exact location of a point in the original signal constellation. The RX data processor 1014 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LIR) of the code symbols associated with the given modulation symbols. The RX data processor 1014 then uses the sequence of code symbol LLRs in order to decode the data that was originally transmitted before providing the data to the MAC layer.

Figure 11:
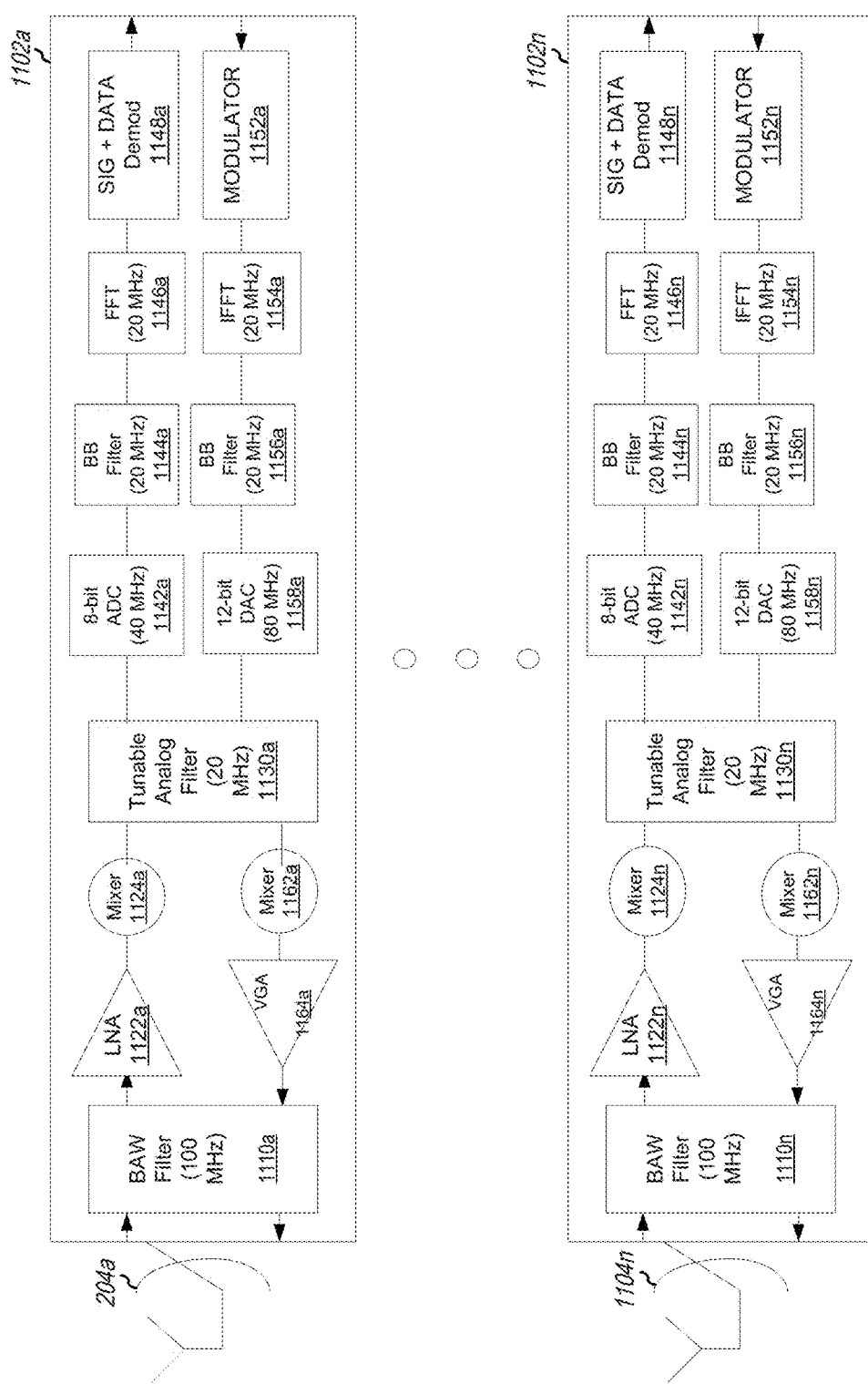
FIG. 11 is a block diagram illustrating an example of a hardware configuration for the front end processing system of FIG. 9, in aspects of the present disclosure.

FIG. 11 is a conceptual block diagram illustrating an example of the signal processing functions of a front end architecture 1100 for an access point, e.g., access point 150 or 160, the architecture 1100 including a plurality of channel modules 1102a-n. The components of the channel module 1102a will be used to describe the function and operation of all the channel modules 1102a-1102n. As shown, the channel module 1102a includes a receive side and a transmit side.

On the receive side, a bulk acoustic wave (BAW) filter 1110a filters a signal received from an antenna 1104a. As each of the VFIT channels requires isolation, each VHT channel may be provided by a separate antenna 1104 a-n. In one aspect, each antenna 1104a-n is separated from each other by 2-10 lambda of spacing, or more depending on the physical configuration of the access point 110. This provides approximately 20 dB of isolation. In addition, the antennas 1104a-n may have different polarizations to provide further isolation between the antennas 1104a-n.

The filtered signal from the BAW filter 1110a is then provided to a low noise amplifier (INA) 1122a. The INA 1122a amplifies the signals captured by the antenna 1104a and filtered by the BAW filter 1110a. The LNA 1122a is placed at the front portion of the receive side of the front end architecture 1100 as the overall noise figure of the receive side is significantly affected by the first few stages of processing. Using the LNA 1122a, the noise of all subsequent stages of the receive side of the front end architecture 1100 is reduced by the gain of the LNA 1122a. However, any noise caused by the LNA 1122a will be injected directly into the received signal. Thus, it is preferable that the INA 1122a to boost the desired signal power while adding as little noise and distortion as possible so that the retrieval of this signal is possible in the later stages in the system.

A mixer 1124a receives the signal from the LNA 1122a. The purpose of the mixer is to down-convert the RF signal to a IF or baseband signal, before sending it to a tunable analog filter 1110a. The tunable analog filter 1110a filters out unwanted signals and allows selected frequencies and signals to pass. The filter can be "tuned" to one or more adjacent 20 MHz channels to accommodate the VHT channel bandwidth. Each tunable analog filter 1110a-n may then be use to filter for a particular channel.

An analog-to-digital converter (ADC) 1142a receives the signal, filtered from tunable analog filter 1110a, and converts the analog signal to a digital signal. The ADC 1142a samples the analog signal with a sampling rate that is at least twice the bandwidth of the tunable analog filter 1110a with a sampling of 8-bits. The digital signal is then output to a digital baseband (BB) filter 1144a.

The BB filter 1144a filters the digital signal to extract the signal that is sent to a fast Fourier transform unit (FFT) 1146a. The FYI 1116a converts the signal from a time domain to a frequency domain, separating the signal into its magnitude and phase components, before sending it to a demodulator 1148a.

The demodulator 1148a will decode the signal to extract the data symbols (modulation symbols) to pass the stream of symbols for processing by a back end receiver data processor (not shown).

On the transmit side, a modulator 1152a processes a data stream to create a stream of modulated symbols for an inverse fast Fourier transform unit (IFFT) 1154a.

The IFFT 1154a transforms the sequence of modulation symbols to a time domain stream that is sent to a baseband (BB) filter 1156a.

The BB filler 1156a receives the time domain stream and provides further noise rejection to ensure that the images are at least 15 dB below noise floor.

The digital-to-analog converter (DAC) 1158a converts the digital signal, based on a 12-bit signal, into an analog signal to be sent to the tunable analog filter 1110a.

After the signal has been filtered and sent to a mixer 1162a, it is sent to a variable gain amplifier (VGA) 1164a. The VGA 1164a will provide a signal that is matched to the BAW filter 1110a.

The BAW filter 1110a then transmits the signal using the antenna 1104a. The BAW filter 1110a provides approximately 10 dB of isolation, and the tunable analog filter 1110a provides approximately 50 dB of isolation.

The following describe the worse case computations for the front end architecture. Assuming the modern is transmitting on a channel A at +20 dBm and receiving a packet on a channel B @−90 dBm (~0 dB SNR). And, assuming an antenna isolation of 20 dB and a BAW filter rejection of 40 dB, the image A is @−40 dBm, and the receiver packet on the channel B is @−90 dBm. Then, the image power should be in the linear range of the INA and the mixer, i.e., no harmonics or non-linearities are created. The tunable analog filter provides another 50 dB of rejection, leading the image A power to be @−90 dBm. With a 1-bit ADC additional overhead (9-bit ADC), 3 such image channels may be accommodated. The digital BB filter provides another 15 dB of rejection to ensure that the images are at least 15 dB below noise floor.

Additional architectural considerations are as follows. VHT channel bandwidths of 20 n MHz, can be supported, where n=1, 2, 3, 4. The adjustable ADC sampling rate may be 40 n MHz. Adjustable analog digital filter bandwidth may be 20 n MHz, and adjustable FFT/IFFT bandwidths may be 20 n MHz. Furthermore, BB processing for all channels can be on the same chip to reduce area. Independent ADC and DAC per channel may be used. Although, the RF processing for all channels may be on the same chip to reduce area, the processing may be performed on separate chips to improve isolation. There may be a shared local oscillation across all channels.

Figure 12:
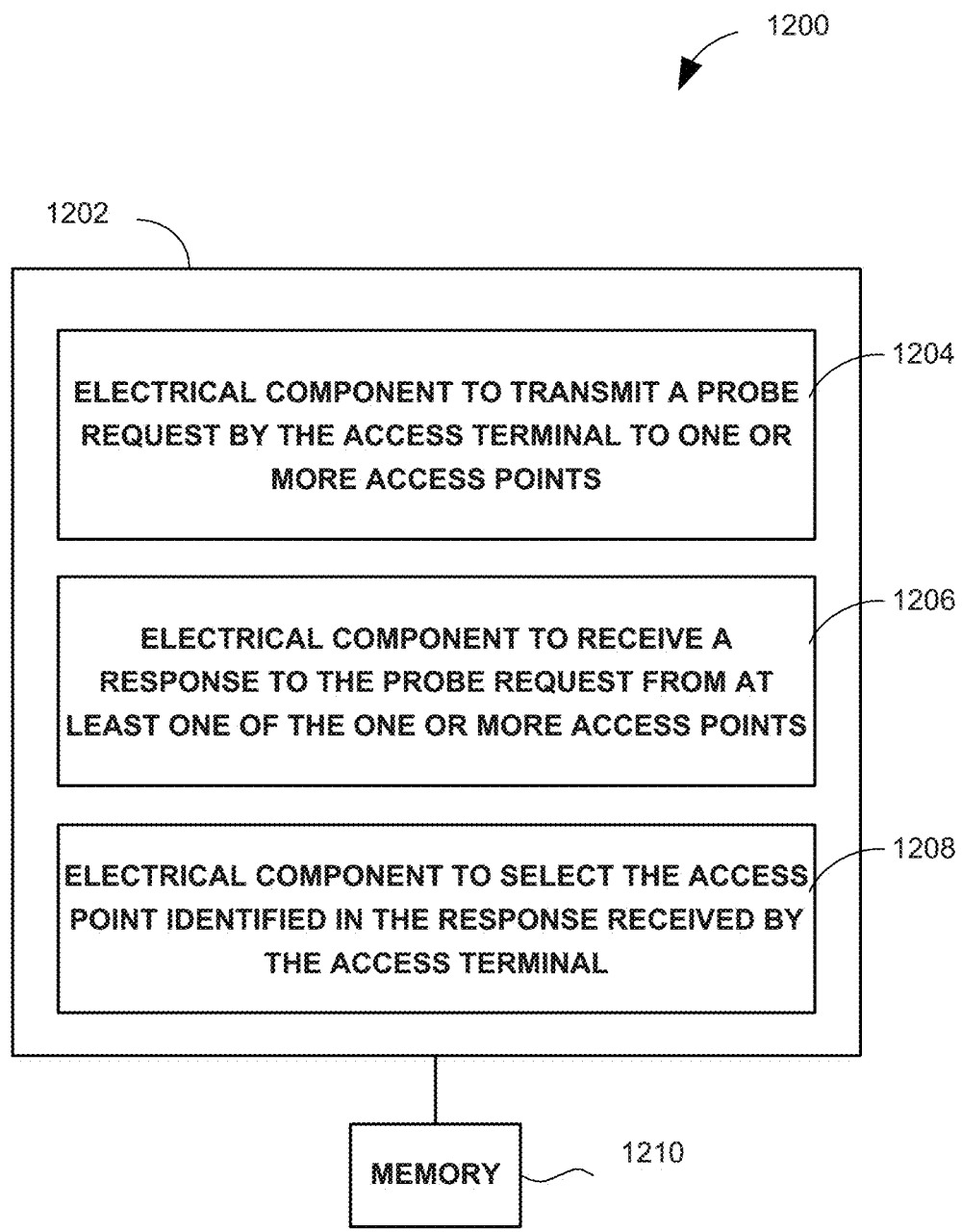
FIG. 12 illustrates an example block diagram of a logical grouping of electrical components in aspects of the present disclosure.

Referring to FIG. 12, an example system 1200 is displayed for selecting an access point (AP) at an access terminal (AT).

For example, system 1200 can reside at least partially within an access terminal (AT), for example, AT 110, 120, and/or 130 (FIG. 1), and/or AT selection manager 510 (FIG. 5). It is to be appreciated that system 1200 is represented as including functional blocks, which can be functional blocks that represent functions implemented by a processor, software, or combination thereof (for example, firmware). System 1200 includes a logical grouping 1202 of electrical components that can act in conjunction. For instance, logical grouping 1202 may include an electrical component 1204 for transmitting a probe request by the AT to one or more APs. For example, in an aspect, electrical component 1204 may comprise AT selection manager 510 (FIG. 5) and/or probe transmitting component 520 (FIG. 5).

Further, logical grouping 1202 may include an electrical component 1206 to receive a response to the probe request from at least one of the one or more APs. For example, in an aspect, electrical component 1206 may comprise AT selection manager 510 (FIG. 5) and/or response receiving component 530 (FIG. 5).

Furthermore, logical grouping 1202 may include an electrical component 1208 to select the AP in the response received by the AT. For example, in an aspect, electrical component 1208 may comprise AT selection manager 510 (FIG. 5) and/or access point selecting component 540 (FIG. 5).

Additionally, system 1200 can include a memory 1510 that retains instructions for executing functions associated with the electrical components 1204, 1206, and 1208, stores data used or obtained by the electrical components 1204, 1206, and 1208, etc. While shown as being external to memory 1210, it is to be understood that one or more of the electrical components 1204, 1206, and 1208 can exist within memory 1210. In one example, electrical components 1204, 1206, and 1208 can comprise at least one processor, or each electrical component 1204, 1206, and 1208 can be a corresponding module of at least one processor. Moreover, in an additional or alternative example, electrical components 1204, 1206, and 1208 can be a computer program product including a computer readable medium, where each electrical component 1204, 1206, and 1208 can be corresponding code.

Figure 13:
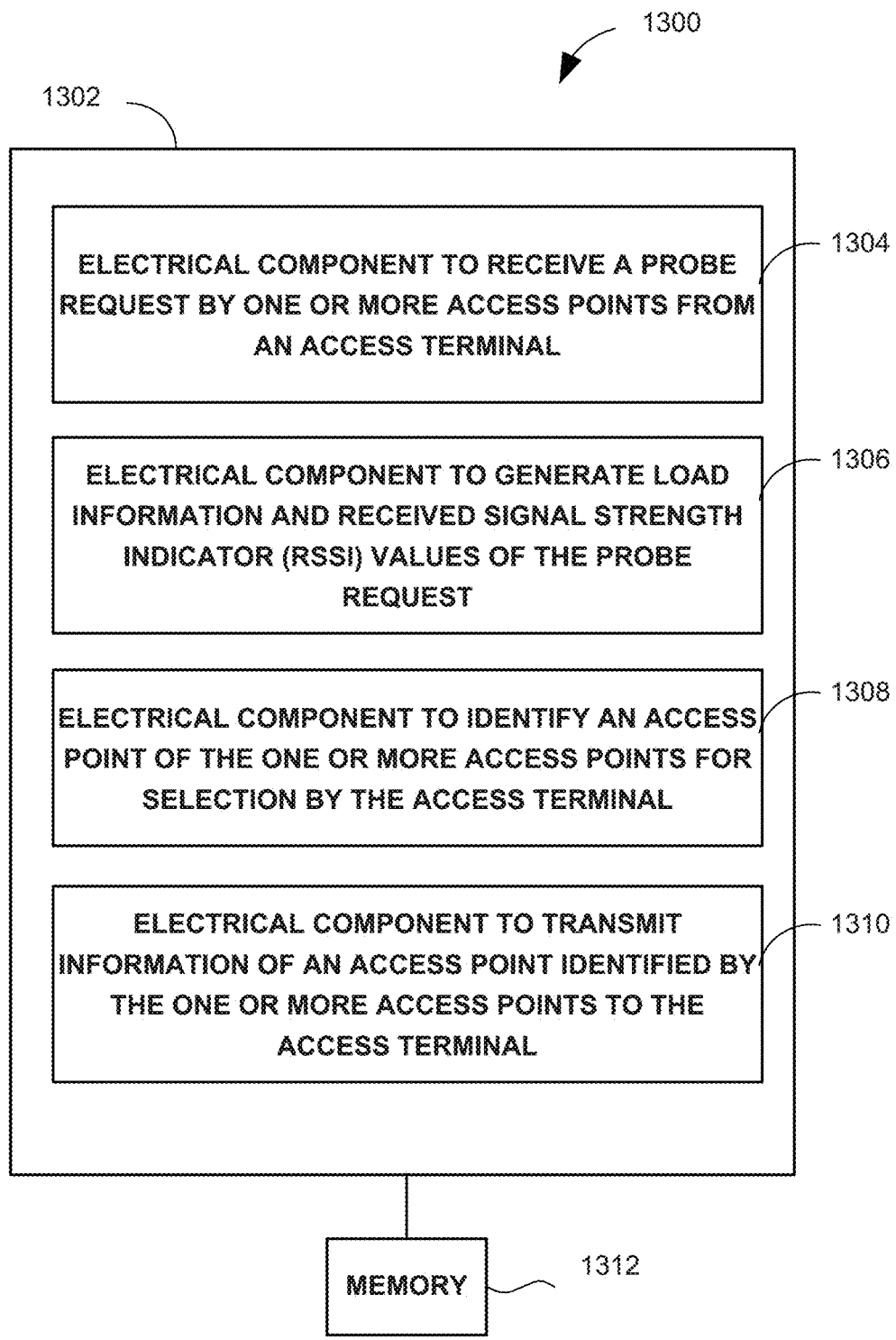
FIG. 13 illustrates an additional example block diagram of a logical grouping of electrical components in aspects of the present disclosure.

Referring to FIG. 13, an example system 1300 is displayed for identifying an access point (AP) for selection by an access terminal (AT).

For example, system 1300 can reside at least partially within an access point, for example, AP 150 and/or 160 (FIG. 1) and/or AP manager 610 (FIG. 6). It is to be appreciated that system 1300 is represented as including functional blocks, which can be functional blocks that represent functions implemented by a processor, software, or combination thereof (for example, firmware). System 1300 includes a logical grouping 1302 of electrical components that can act in conjunction. For instance, logical grouping 1302 may include an electrical component 1304 to receive a probe request by one or more APs from an AT, wherein the probe request is broadcasted by the AT to the one or more APs. For example, in an aspect, electrical component 1304 may comprise AP manager 610 (FIG. 6) and/or probe receiving component 620 (FIG. 6).

Additionally, logical grouping 1302 may include an electrical component 1306 to generate load information and Received Signal Strength Indicator (RSSI) values of the probe request at the one or more APs. For example, in an aspect, electrical component 1306 may comprise AP manager 610 (FIG. 6) and/or load generating component 630 (FIG. 6).

Further, logical grouping 1302 may include an electrical component 1308 to identify an AP of the one or more APs for selection by the AT, wherein the AP for selection by the AT is identified by the one or more APs based at least on the load information and RSSI values generated at the one or more APs. For example, in an aspect, electrical component 1308 may comprise AP manager 610 (FIG. 6) and/or AP identifying component 640 (FIG. 6).

Furthermore, logical grouping 1302 may include an electrical component 1310 to transmit information of an AP identified by the one or more APs to the AT. For example, in an aspect, electrical component 1310 may comprise AP manager 610 (FIG. 6) and/or transmitting component 650 (FIG. 6).

Additionally, system 1300 can include a memory 1312 that retains instructions for executing functions associated with the electrical components 1304, 1306, 1308, and 1310, stores data used or obtained by the electrical components 1304, 1306, 1308, and 1310, etc. While shown as being external to memory 1312, it is to be understood that one or more of the electrical components 1304, 1306, 1308, and 1310 can exist within memory 1312. In one example, electrical components 1304, 1306, 1308, and 1310 can comprise at least one processor, or each electrical component 1304, 1306, 1308, and 1310 can be a corresponding module of at least one processor. Moreover, in an additional or alternative example, electrical components 1304, 1306, 1308, and 1310 can be a computer program product including a computer readable medium, where each electrical component 1304, 1306, 1308, and 1310 can be corresponding code.

Figure 14:
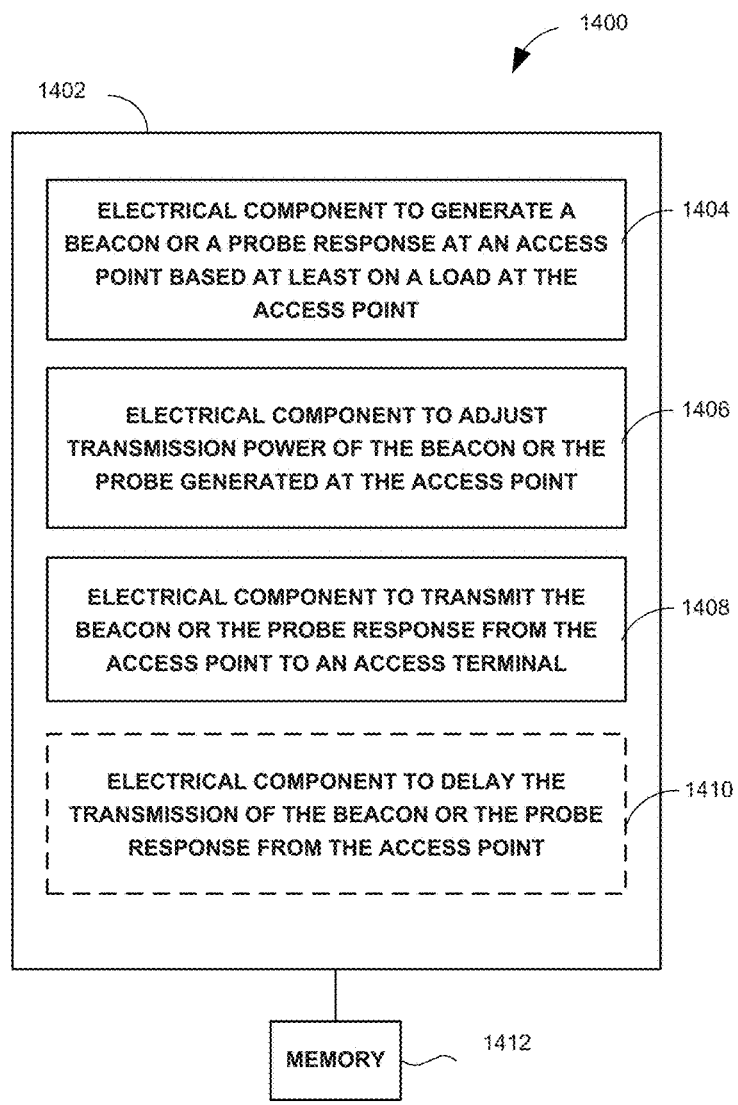
FIG. 14 illustrates a further additional example block diagram of a logical grouping of electrical components in aspects of the present disclosure.

Referring to FIG. 14, an example system 1400 is displayed for generating beacons or probe responses at one or more access points (AP).

For example, system 1400 can reside at least partially within an access point (AP), AP 150 and/or 160 (FIG. 1) and/or AP manager 710 (FIG. 7). It is to be appreciated that system 1400 is represented as including functional blocks, which can be functional blocks that represent functions implemented by a processor, software, or combination thereof (for example, firmware). System 1400 includes a logical grouping 1402 of electrical components that can act in conjunction. For instance, logical grouping 1402 may include an electrical component 1404 to generate a beacon or a probe response at an AP of the one or more APs based at least on a load, at the AP. For example, in an aspect, electrical component 1404 may comprise AP manager 710 (FIG. 7) and/or beacon or probe response generating component 720 (FIG. 7).

Additionally, logical grouping 1402 may include an electrical component 1406 to adjust transmission power of the beacon or the probe response generated at the AP based at least on the load at the AP. For example, in an aspect, electrical component 1406 may comprise AP manager 710 (FIG. 7) and/or beacon or transmission power adjusting component 730 (FIG. 7).

Further, logical grouping 1402 may include an electrical component 1408 to transmit the beacon or the probe response from the AP to an access terminal (AT) based at least on the adjusted transmission power. For example, in an aspect, electrical component 1408 may comprise AP manager 710 (FIG. 7) and/or transmitting component 740 (FIG. 7).

Furthermore, in an optional aspect, logical grouping 1402 may optionally include an electrical component 1410 to delay the transmission of the beacon or the probe response from the AP based at least on the load of the AP. For example, in an aspect, electrical component 1410 may comprise AP manager 710 (FIG. 7) and/or transmitting delaying component 750 (FIG. 7).

Additionally, system 1400 can include a memory 1412 that retains instructions for executing functions associated with the electrical components 1404, 1406, 1408, and/or 1410, stores data used or obtained by the electrical components 1404, 1406, 1408, and/or 1410, etc. While shown as being external to memory 1412, it is to be understood that one or more of the electrical components 1404, 1406, 1408, and/or 1410 can exist within memory 1412. In one example, electrical components 1404, 1406, 1408, and/or 1410 can comprise at least one processor, or each electrical component 1404, 1406, 1408, and/or 1410 can be a corresponding module of at least one processor. Moreover, in an additional or alternative example, electrical components 1404, 1406, 1408, and/or 1410 can be a computer program product including a computer readable medium, where each electrical component 1404, 1406, 1408, and/or 1410 can be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method of identifying an access point (AP) for selection by an access terminal (AT), comprising:
receiving, at an AP of one or more APs, a probe request broadcasted by the AT to the one or more APs, wherein the AP and the AT are at different versions of Hotspot specifications;

generating, at the AP, load information and Received Signal Strength Indicator (RSSI) values of the probe request received from the AT, wherein the load information at the AP is generated as a utility function of at least one of a number of ATs connected to the AP, traffic on the AP, last association event, latency, or backhaul quality;

transmitting, from the AP, a probe response to the AT in response to determining that the AP has a highest value of the utility function among the one or more APs; and transmitting information of the AP to the AT.

2. The method of claim 1, wherein the one or more APs are listed based on utility function values.

3. The method of claim 1, further comprising:
receiving rankings of the one or more APs from a central server.

4. An apparatus for identifying an access point (AP) for selection by an access terminal (AT), comprising:
a memory configured to store data; and
one or more processors communicatively coupled with the memory, wherein the one or more processors and the memory are configured to:
receive, at an AP of one or more APs, a probe request broadcasted by the AT to the one or more APs, wherein the AP and the AT are at different versions of Hotspot specifications;
generate, at the AP, load information and Received Signal Strength Indicator (RSSI) values of the probe request received from the AT, wherein the load information at the AP is generated as a utility function of at least one of a number of ATs connected to the AP, traffic on the AP, last association event, latency, or backhaul quality;
transmit, from the AP, a probe response to the AT in response to determining that the AP has a highest value of the utility function among the one or more APs; and
transmit information of the AP to the AT.

5. The apparatus of claim 4, wherein the one or more APs are listed based on utility function values.

6. The apparatus of claim 4, wherein the one or more processors and the memory are further configured to:
receive rankings of the one or more APs from a central server based on utility function values.

7. An apparatus for identifying an access point (AP) for selection by an access terminal (AT), comprising:
means for receiving, at an AP of one or more APs, a probe request broadcasted by the AT to the one or more APs, wherein the AP and the AT are at different versions of Hotspot specifications;

means for generating, at the AP, load information and Received Signal Strength Indicator (RSSI) values of the probe request received from the AT, wherein the load information at the AP is generated as a utility function of at least one of a number of ATs connected to the AP, traffic on the AP, last association event, latency, or backhaul quality;

means for transmitting, from the AP, a probe response to the AT in response to determining that the AP has a highest value of the utility function among the one or more APs; and means transmitting information of the AP to the AT.

8. The apparatus of claim 7, wherein the one or more APs are listed based on utility function values.

9. The apparatus of claim 7, further comprising:
means for receiving rankings of the one or more APs from a central server.

10. A non-transitory computer readable medium storing computer executable code for identifying an access point (AP) for selection by an access terminal (AT), comprising:
code for receiving, at an AP of one or more APs, a probe request broadcasted by the AT to the one or more APs, wherein the AP and the AT are at different versions of Hotspot specifications;
code for generating, at the AP, load information and Received Signal Strength Indicator (RSSI) values of the probe request received from the AT, wherein the load information at the AP is generated as a utility function of at least one of a number of ATs connected to the AP, traffic on the AP, last association event, latency, or backhaul quality;
code for transmitting, from the AP, a probe response to the AT in response to determining that the AP has a highest value of the utility function among the one or more APs; and
code for transmitting information of the AP to the AT.

11. The computer readable medium of claim 10, wherein the one or more APs are listed based on utility function values.

12. The computer readable medium of claim 10, further comprising:
code for receiving rankings of the one or more APs from a central server.

* * * * *